United States Patent [19]

Rolston et al.

[11] Patent Number: 5,743,488
[45] Date of Patent: Apr. 28, 1998

[54] AERODYNAMIC LOW DRAG STRUCTURE

[75] Inventors: Stephen C. Rolston, Bristol, United Kingdom; Edward M. Ashford, Craigavon, Northern Ireland

[73] Assignee: Short Brothers PLC, Belfast, Northern Ireland

[21] Appl. No.: 567,222

[22] Filed: Dec. 5, 1995

[30] Foreign Application Priority Data

Dec. 5, 1995 [GB] United Kingdom ............... 9424495

[51] Int. Cl.$^6$ ........................................... B64D 33/02
[52] U.S. Cl. ................................ 244/53 B; 181/214
[58] Field of Search ............................... 244/207, 208, 244/209, 205, 201, 204, 198, 200, 130, 53 B; 181/203, 206, 213, 214; 137/15.1, 15.2

[56] References Cited

U.S. PATENT DOCUMENTS

| 4,154,256 | 5/1979 | Miller .................................. 244/53 B |
| 4,502,651 | 3/1985 | Jungclaus et al. ...................... 244/53 B |
| 4,522,360 | 6/1985 | Barnwell et al. ........................ 244/204 |
| 4,749,150 | 6/1988 | Rose et al. .................................. 244/53 |
| 4,863,118 | 9/1989 | Stallings, Jr. et al. .................... 244/130 |
| 5,167,387 | 12/1992 | Hartwich ................................. 244/200 |
| 5,297,765 | 3/1994 | Hughes et al. .......................... 244/509 |
| 5,335,885 | 8/1994 | Bohning .................................. 244/204 |
| 5,366,177 | 11/1994 | DeCoux .................................. 244/201 |

FOREIGN PATENT DOCUMENTS

| 619722  | 3/1949 | United Kingdom . |
| 2187261 | 6/1985 | United Kingdom . |

*Primary Examiner*—Galen L. Barefoot
*Attorney, Agent, or Firm*—Lyon & Lyon LLP

[57] ABSTRACT

Boundary layer separation at the boundary surface of an intake duct (18) of a turbofan aeroengine nacelle (12) at conditions of high incidence and high engine mass flow arises from shockwave induced pressure gradients in the boundary layer. To control separation, gaseous fluid is withdrawn from a high pressure region of the boundary layer at a downstream region of the boundary surface, conveyed within the intake duct structure (19) and discharged at an upstream region of the boundary surface into a low pressure region of the boundary layer. The intake duct (18) embodies a noise attenuation panel (19), and fluid is withdrawn from the high pressure region of the boundary layer into a modified panel section (191) by passage through apertures (30) in the front face of the panel section (191) at a downstream region of the panel section, conveyed along a fluid communication path within the panel section (191) and discharged into the low pressure region of the boundary layer by passage through apertures (30) in the front face of the panel section (191) at an upstream region of the panel section (191). Gaseous fluid is conveyed solely as a consequence of the difference in pressures in the boundary layer at the downstream and upstream regions.

21 Claims, 3 Drawing Sheets

AERODYNAMIC LOW DRAG STRUCTURE

BACKGROUND OF THE INVENTION

The field of the present invention is aerodynamic low drag structures.

The function of a nacelle for a turbofan aeroengine is generally twofold. Firstly, the nacelle must provide a flow of intake air of minimal disturbance to the fan for a variety of flight conditions including high incidence attitude at take off. Secondly, the external profile of the nacelle should be such as to minimise aerodynamic drag subject to constraints imposed by the major engine components. Furthermore, the complete structure should be designed to minimise weight.

As a consequence of the above-mentioned functional requirements, the final aerodynamic design of a nacelle is a compromise between the best possible performance at the design point—cruise—while ensuring acceptable internal and external flow over a variety of off-design conditions, such as at take off.

In nacelle design the smallest possible maximum diameter for a given fan diameter is desirable to reduce aircraft drag at cruise and to minimise weight. This can be achieved by reducing the thickness of the nacelle nose cowl leading edge.

In U.S. Pat. No. 4,749,150 there is described a proposal by which the thickness of a turbofan nacelle inlet can be reduced to reduce drag during cruise attitude while avoiding turbulence in the intake duct during take off attitude which might result in degradation of fan performance. In that proposal, the boundary layer of air flowing over the inwardly facing surface of the inlet duct is sucked outwardly through a porous noise suppressing liner of the duct to reduce the possibility of degradation of fan performance under take off conditions as well to reduce drag during take off, cruise and approach conditions.

It has however been found that the detrimental effects on fan performance at take off are due primarily to boundary layer separation of the flow in the intake duct caused by the formation of shockwaves in the region of the nacelle intake throat and the associates pressure gradients in the boundary layer at the boundary surface of the intake duct.

While the proposal contained in U.S. Pat. No. 4,749,150 addresses the problem of degradation of fan performance at take off and provides for boundary layer control within the intake duct the proposal provides for uniformly withdrawing air from the boundary layer in a conventional manner and it does not address the specific problem of controlling boundary layer separation caused by the formation of shockwaves and associated pressure gradients in the boundary layer.

SUMMARY OF THE INVENTION

It is an object of the present invention to provide a means for and method of controlling boundary layer separation at the boundary surface of an intake duct at conditions of high incidence and high mass flow arising from shockwave induced pressure gradients in the boundary layer.

According to a first aspect of the present invention, there is provided an aerodynamic low drag structure having a boundary surface which is subjected to fluid flow in a boundary layer adjacent the boundary surface and fluid flow separation control means for controlling boundary layer separation arising from shockwave induced pressure gradients in the boundary layer which produce a high pressure region in the boundary layer adjacent a downstream region of the boundary surface and a low pressure region in the boundary layer adjacent an upstream region of the boundary surface, the fluid flow separation control means comprising fluid conveying means by which gaseous fluid from the high pressure region of the boundary layer is withdrawn at the downstream region of the boundary surface, conveyed within the structure and discharged at the upstream region of the boundary surface into the low pressure region of the boundary layer thereby to reduce the shockwave induced pressure gradient in the boundary layer.

In an embodiment of the invention according to its first aspect and as hereinafter to be described, the boundary surface extends from a leading edge of the structure and is subjected to fluid flow over it from the leading edge.

In an embodiment of the invention according to its first aspect and as hereinafter to be described, the boundary surface is a front face of a structural component and the fluid conveying means comprises a plurality of flow apertures extending through the front face at a downstream region of the front face for the flow of fluid from the high pressure region of the boundary layer into the component and at an upstream region of the front face for the flow of fluid from the component through the front face and into the low pressure region of the boundary layer and a fluid communication path or paths within the component between the flow aperture or apertures at the downstream region and the flow aperture or apertures at the upstream region.

In specific embodiments of the invention according to its first aspect and as hereinafter to be described, the gaseous fluid is conveyed from the high pressure region of the boundary layer at the downstream region of the front face to the low pressure region of the boundary layer at the upstream region of the front face solely as a consequence of the difference in pressures in the boundary layer at the downstream and upstream regions.

In embodiments of the invention according to its first aspect and as hereinafter to be described, the plurality of fluid flow apertures are distributed over a region of the front face extending from a limiting downstream position of the front face to a limiting upstream position of the front face.

In embodiments of the invention according to its first aspect and as hereinafter to be described, the structure is an aeroengine nacelle structure with the leading edge of the structure being formed by a lipskin which defines an intake throat which leads to an intake duct and the front face of the structural component is a boundary surface of the intake duct.

In a specific embodiment of the invention according to its first aspect and as hereinafter to be described, the structural component is a noise attenuation panel, the front face of the structural component is the front face of the a facing component part of the noise attenuation panel, which further includes a cellular component part adjoining a rear face of the facing component part and an imperforate backing component part adjoining the rear face of the cellular component part and the fluid communication path or paths are provided in the cellular component part.

In one specific embodiment of the invention according to its first aspect, the facing component part of the panel has a ratio of open surface area to total surface area providing noise attenuation in the intake duct and the plurality of flow apertures are provided by the open surface areas of the facing component part.

In a further specific embodiment of the invention according to its first aspect and as hereinafter to be described, the plurality of flow apertures are formed in the facing component part of the panel in predetermined spaced relation to each other and the facing component part is otherwise so formed as to provide in the regions between the fluid flow apertures a ratio of open surface area to total surface area for effective noise attenuation in the intake duct.

In specific embodiments of the invention, the facing component part of the noise attenuation panel comprises a porous permeable sheet produced by powder sintering a thermoplastics material and the cellular component part comprises a multiplicity of juxtaposed cells formed by wall portions which provide bounding surfaces for the cells and which terminate at opposite faces of the cellular component part and the fluid communication path or paths are provided by openings in the wall portions between adjacent cells. The openings in the wall portions are preferably located in the region of the backing component part.

In embodiments of the invention according to its first aspect and as hereinafter to be described, the fluid conveying means is confined within the intake duct to a predetermined control region of the intake duct. Advantageously, the predetermined control region of the intake duct is that region only of the intake duct subjected to shockwave induced pressure gradients generated at high nacelle structure incidences and full engine thrust under aircraft takeoff conditions.

The predetermined control region of the intake duct preferably extends circumferentially over a predetermined sector of the intake duct and the sector extends symmetrically to each side of the base centre line of the intake duct and subtends an angle of 90 to 120 degrees. The predetermined control region of the intake duct may furthermore extend longitudinally for a part only of the intake duct and the plurality of flow apertures may then be distributed in spaced relation over the predetermined control region only.

According to a second aspect of the present invention there is provided a method of controlling separation of a boundary layer from a boundary surface of an aerodynamic low drag structure arising from shockwave induced pressure gradients in the boundary layer which produce a high pressure region in the boundary layer adjacent a downstream region of the boundary surface and a low pressure region in the boundary layer adjacent an upstream region of the boundary surface, the method comprising the steps of withdrawing gaseous fluid from the high pressure region of the boundary layer at the downstream region of the boundary surface, conveying it within the structure and discharging it at the upstream region of the boundary surface into the low pressure region of the boundary layer.

In embodiments of the invention according to its second aspect and as hereinafter to be described, the gaseous fluid is conveyed from the high pressure region of the boundary layer at the downstream region of the boundary surface to the low pressure region of the boundary layer at the upstream region of the boundary surface solely as a consequence of the difference in pressures in the boundary layer at the downstream and upstream regions.

In embodiments of the invention according to its second aspect and as hereinafter to be described, the boundary surface extends from a leading edge of the structure and is subjected to fluid flow over it from the leading edge.

In an embodiment of the invention according to its second aspect and as hereinafter to be described, the method is employed to control boundary layer separation in an aeroengine nacelle structure in which the leading edge of the structure is formed by a lipskin which defines an intake throat which leads to an intake duct and in which the boundary surface of the aerodynamic low drag structure is a boundary surface of the intake duct. Advantageously, the fluid is then conveyed from the high pressure region to the low pressure region of the boundary layer over a predetermined control region of the intake duct.

In an embodiment of the invention according to its second aspect and as hereinafter to be described, the predetermined control region of the intake duct within which the gaseous fluid is conveyed is that region only which is subjected to shockwave induced pressure gradients as generated at high nacelle structure incidences and full engine thrust under aircraft take off conditions. The predetermined control region of the intake duct within which the gaseous fluid is conveyed advantageously extends circumferentially over a predetermined sector of the intake duct and the sector within which fluid is conveyed extends symmetrically to each side of the base centre line of the intake duct and subtends an angle of 90 to 120 degrees. Additionally, the predetermined control region of the intake duct within which the gaseous fluid is conveyed extends longitudinally for a part only of the intake duct.

According to a third aspect of the present invention there is provided an aircraft propulsive power unit including an aeroengine nacelle structure according to the first aspect of the invention and an aeroengine to which a flow of intake air is supplied through the intake duct.

According to a fourth aspect of the present invention there is provided an aircraft including a propulsive power unit in accordance with the third aspect of the invention.

Embodiments of the invention will now be described by way of example with reference to the accompanying drawings in which.

DETAILED DESCRIPTION OF THE PRESENT EMBODIMENTS

Figure 1:
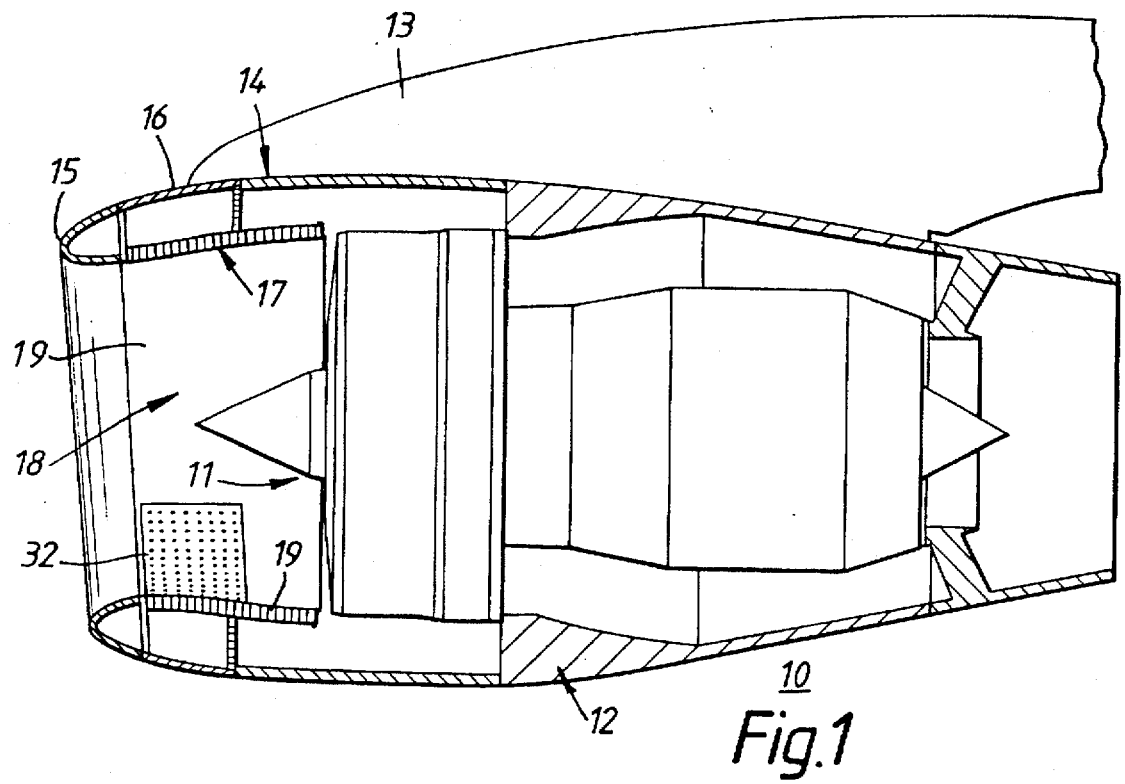
FIG. 1 is a schematic cross-section of an aircraft propulsive power unit including a low drag nacelle structure and a turbofan aeroengine housed within the nacelle structure.

Referring first to FIG. 1, an aircraft propulsive power unit 10 is schematically illustrated and includes a turbofan power unit 11 mounted within a nacelle 12 suspended from a pylon 13. The nacelle 12 includes a nose cowl 14 having a leading edge lipskin 15 which defines an intake throat, an outer wall 16 which defines the external boundary surface of the nose cowl 14 and an inner wall 17 which defines an intake duct 18 of the nose cowl 14. The inner wall 17 is formed by noise attenuation panels 19 which serve to reduce noise created by the high speed flow of air passing through the duct 18 into the power unit 11, as well as to reduce noise generated by the fan blades of the unit 11.

The panels 19 are of arcuate form, possibly of double curvature, and form structural wall components of the intake duct 18, which is formed by several panels 19 arranged circumferentially in juxtaposed positions.

Figure 2:
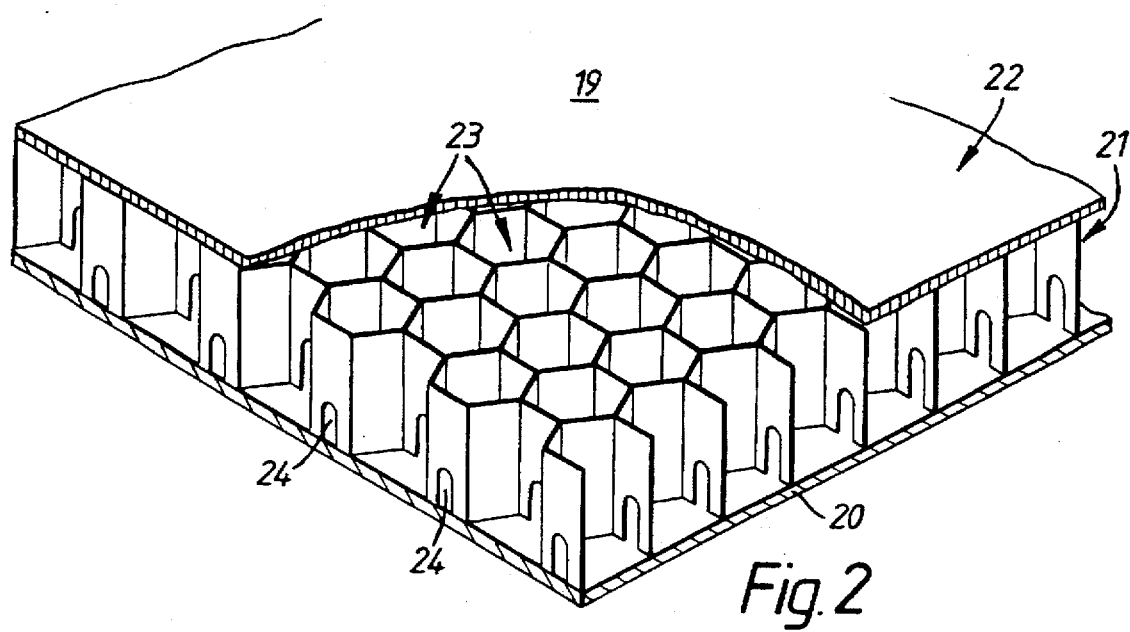
FIG. 2 is an enlarged isometric cutaway view of a noise attenuation panel forming part of the intake duct of the nose cowl illustrated in FIG. 1.

The panels 19 may take any one of a variety of different forms and one form which is in common use and which is illustrated in FIG. 2 comprises a backing sheet 20, a cellular core component 21 and a facing sheet 22. The facing sheet 22 is a porous permeable facing sheet and in the form shown is produced as a sheet by powder sintering a thermoplastics material. The material may be a composite material formed from a thermoplastics matrix material reinforced with one or more non-thermoplastic reinforcing materials. The facing sheet 22 may alternatively take the form of a porous permeable outer sheet produced for example by powder sintering a thermoplastics material and an inner sheet formed as a carbon fibre woven fabric or a metal mesh. The cellular core component 21 comprises a multiplicity of open-ended juxtaposed cells 23 of hexagonal cross-section to provide a honeycomb configuration. The walls of the cells 23 extend from the front face of the cellular core component 21 to the rear face of the component where they are bonded to the backing sheet 20 which takes the form of an imperforate solid sheet and which may be formed from any one of a variety of different materials. The walls of the cells 23 are usually provided with drainage slots 24 to allow for condensates to drain circumferentially round the intake duct 18 for discharge in the region of the base of the intake duct 18.

The panels 19 lining the intake duct 18 in FIG. 1 and as illustrated in FIG. 2 produce air noise attenuation by a viscous pressure losses associated with the passage of sound waves through the facing sheet 14 and standing wave effects in the cells 23 of the core component 21, resulting in sound energy being dissipated as heat energy and are arranged solely for this purpose.

Figure 3:
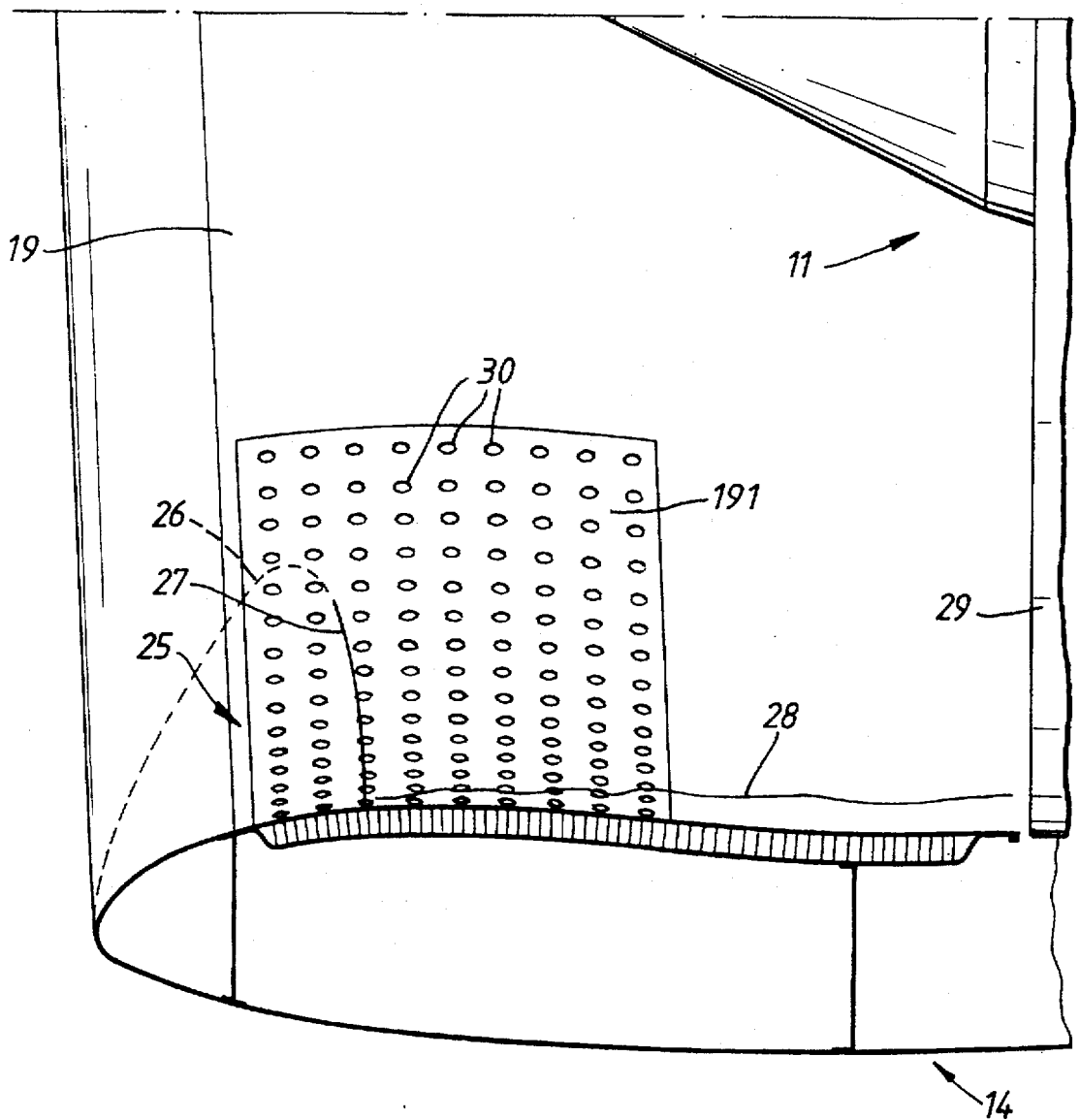
FIG. 3 is a schematic sectional scrap view of part of the nose cowl of the nacelle structure shown in FIG. 1 illustrating the lower lip portion of the nose cowl.

Turning now to FIG. 3, which is a scrap view of the nacelle shown in FIG. 1, the nose cowl 14 is shown to have a thickness such that flow separation in the intake duct is minimised at off design conditions. By reducing the nose cowl thickness the drag and weight of the nacelle 12 may be reduced but flow velocities over a thin leading edge lipskin are significantly increased due to the smaller lip contraction ratio employed in such a design. At take-off, with high nacelle incidences and high engine mass flow intake, this smaller contraction ratio can result in the formation of a pocket 25 of supersonic flow in the region of the intake throat as diagrammatically illustrated. This pocket of supersonic flow is bounded by a sonic Mach contour 26 and terminated by a shock wave 27.

The rapid deceleration of air flow through the shock wave 27 results in an increase in pressure across the shock wave 27. The pressure gradient across the shock wave will in some circumstances be strong enough to cause separation of the air flow in a boundary layer 28 adjacent the noise attenuation panels 19. This separation results in a decrease in the total pressure recovery and an increase in flow distortion at the engine fan-face 29 and consequently a deterioration in intake performance.

The strength of the pressure gradient in the region of the intake throat is reduced by allowing a small portion of air in the higher pressure region downstream of the shock wave pressure gradient to be conveyed to the lower pressure region upstream of the shock wave pressure gradient. The conveying of air from downstream to upstream of the pressure gradient is achieved by modifying the noise attenuation panel 19 in the region of the pressure gradient so that it allows the required passage of air therethrough.

Figure 4:
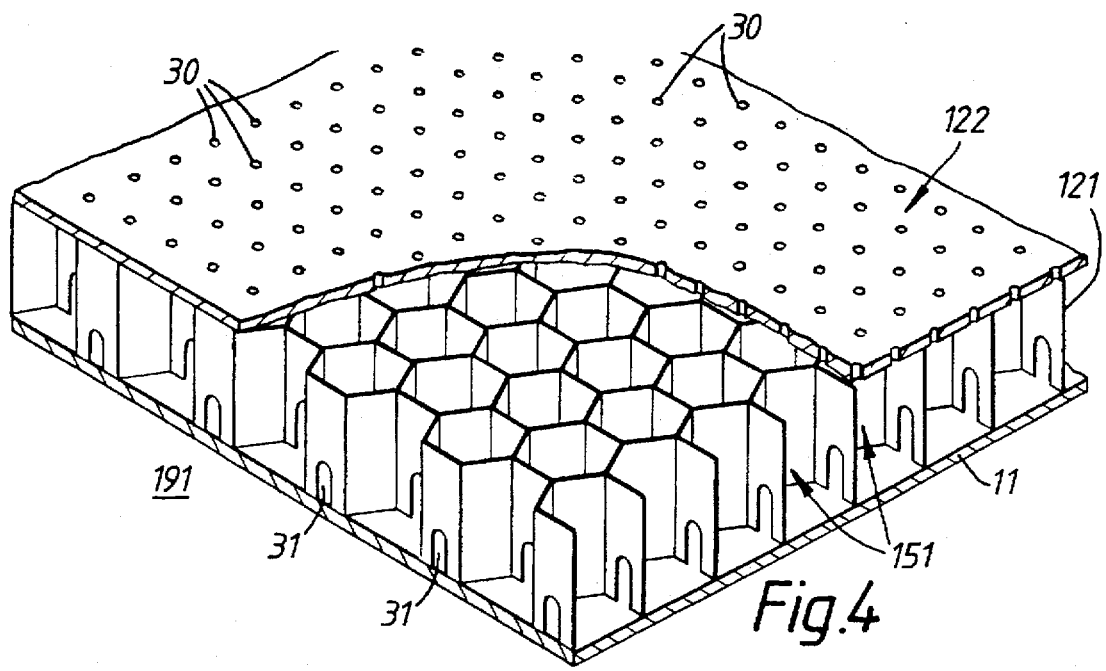
FIG. 4 is an isometric cutaway view of a modified noise attenuation panel for use at a flow separation control region of the intake duct of the nose cowl illustrated in FIG. 1.

Referring now to FIG. 4 a modified noise attenuation panel 191 is illustrated, which can be used in the region of the pressure gradient. It has the same general form as the panels 19 described with reference to FIG. 2 and can be produced in the same manner. It is composed of a porous permeable facing sheet 122 bonded to a honeycomb core component 121 which is formed by juxtaposed cells 151 and which is in turn bonded to a solid backing sheet 11. These features are common to the noise attenuation panels 19 described with reference to FIG. 2 and noise attenuation is achieved as before with viscous pressure losses associated with the passage of sound waves through the facing sheet 122 and standing wave effects in the honeycomb core component 121 resulting in sound energy from the engine being dissipated as heat energy.

The noise attenuation panel 191 illustrated in FIG. 4 is modified by providing the porous facing sheet 122 with perforations 30 to allow for the desired air mass flow through the facing sheet 122 into the honeycomb core component 121. Furthermore, beneath the modified facing sheet 121 the walls of the cells 151 of the honeycomb core component 121 are provided with breather slots 31 to allow for the passage of air through the core component 121. The panel 191 is so positioned in the intake duct 18 that the slots 30 permit the passage of air in the fore/aft direction i.e. from downstream to upstream of the shock wave 27.

The pressure differential across the shock wave pressure gradient drives a circulatory flow from downstream to upstream of the pressure gradient via perforations 30 in the facing sheet 122 and the honeycomb core component breather slots 31. The desired mass flow of circulatory air for optimum performance may be achieved by specifying the open surface area of the facing sheet 122 in the region of the pressure gradient or alternatively by specifying the size of the breather slots 31 in the honeycomb core component 121.

Figure 5:
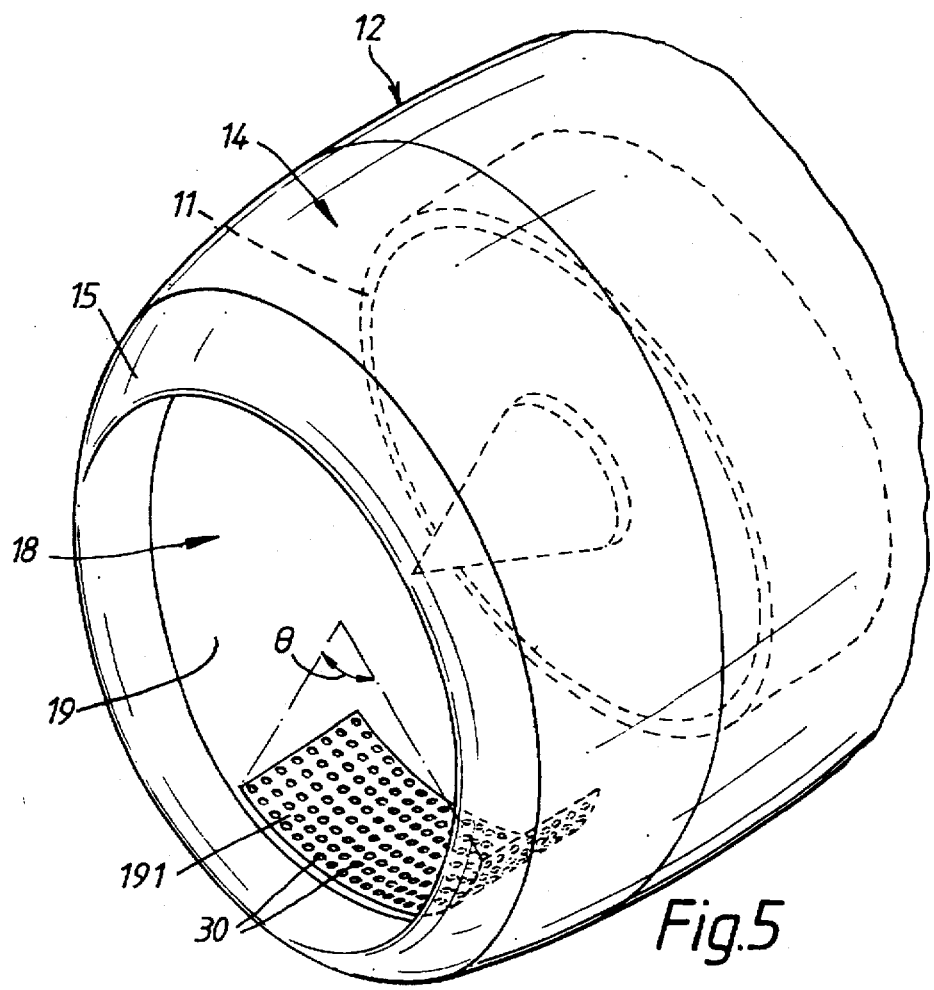
FIG. 5 is an isometric view of the nose cowl of the nacelle structure shown in FIGS. 1 and 2, illustrating the preferred disposition of the modified panel shown in FIG. 4.

The disposition of the modified noise attenuation panel 191 is schematically illustrated in FIG. 5 While there is no specific limitation on the circumferential and longitudinal extent of the modified panel 191, it will typically subtend an angle $\theta$ of 90°–120° around the nacelle circumference symmetrically with respect to a centre base line and will extend from the leading edge of the noise attenuation panel 19 where it is fixed to the nose cowl to 40–80% of the axial length normally occupied by the noise attenuation panels 19.

Modifications to the noise attenuation panel in the flow separation control region 32 are only to allow for a circulatory flow from downstream to upstream of the pressure gradient in the region of the intake throat and these modifications will be such as to have a minimal effect on the acoustic performance of the noise attenuation panel.

The embodiment of the invention described with reference to the accompanying drawings is based upon the use of the well established noise attenuation panel design which uses a cellular honeycomb core component beneath a facing sheet. The accompanying drawings show a single layer honeycomb core but it will be appreciated by those versed in the art that this does not preclude the use of a double layer core as is common on certain applications.

It will further be appreciated that other forms of noise attenuation panels are equally applicable for carrying out the object of the present invention. For example, the honeycomb core component may be replaced with a bulk material. The only requirement of the noise attenuation panel is that it makes provision for the necessary recirculation of air from downstream to upstream of the shock wave.

In addition, it will be appreciated that the flow separation control region does not necessarily need to be presented by a noise attenuation panel. Other types of structural components could provide the means for conveying fluid from the high pressure downstream region to the low pressure upstream region or alternatively a flow separation control region could be formed as an integral part of the nose cowl.

The advantages of the disclosed nacelle structure are that a smaller nacelle nose cowl thickness can be specified for a given fan diameter thereby reducing nacelle weight and drag at cruise without suffering the adverse effects arising from the generation of shock waves at the intake throat at takeoff and other adverse flight conditions.

What is claimed is:

1. An aeroengine nacelle structure including an intake duct, comprising a lipskin defining an intake throat leading into the intake duct and including a noise attenuation panel having a facing component part with a front face which forms a boundary surface of the intake duct and which is subjected to fluid flow over it in a boundary layer adjacent the boundary surface, the facing component part of the noise attenuation panel having a plurality of flow apertures which extend through the facing component part at a downstream region of the attenuation panel and at an upstream region of the attenuation panel, the noise attenuation panel further having a cellular component part adjoining a rear face of the facing component part, the cellular component part having fluid communication path means for withdrawing gaseous fluid from a high pressure region of the boundary layer through the apertures at the downstream region of the attenuation panel, conveying within the cellular component part and discharging through the apertures at the upstream region of the attenuation panel into a low pressure region of the boundary layer to control boundary layer separation of the boundary layer from the boundary surface of the attenuation panel arising from shockwave induced pressure gradients in the boundary layer.

2. The aeroengine nacelle structure of claim 1, the gaseous fluid being conveyed from the high pressure region of the boundary layer at the downstream region of the attenuation panel to the low pressure region of the boundary layer at the upstream region of the attenuation panel solely as a consequence of the difference in pressures in the boundary layer at the downstream and upstream regions.

3. The aeroengine nacelle structure of claim 1, the fluid communication path means being confined within the intake duct to a predetermined control region of the intake duct.

4. The aeroengine nacelle structure of claim 3, the predetermined control region being that region only of the intake duct subjected to shockwave induced pressure gradients generated at high nacelle structure incidences and full engine thrust under aircraft takeoff conditions.

5. The aeroengine nacelle structure of claim 2, the predetermined control region of the intake duct extending circumferentially over a predetermined sector of the intake duct.

6. The aeroengine nacelle structure of claim 5, the sector extending symmetrically to each side of the base centre line of the intake duct.

7. The aeroengine nacelle structure of claim 6, the sector subtending an angle of 90° to 120°.

8. The aeroengine nacelle structure of claim 3, the predetermined control region of the intake duct extending longitudinally for a part only of the intake duct.

9. The aeroengine nacelle structure of claim 3, the plurality of flow apertures being distributed in spaced relation over the predetermined control region only.

10. The aeroengine nacelle structure of claim 1, the noise attenuation panel further having an imperforate backing component part, the cellular component part further having a rear face adjoining the imperforate backing component part, wall portions terminating at opposite faces of the cellular component part and forming a multiplicity of juxtaposed cells and forming bounding surfaces for the cells, the fluid communication path means having openings in the wall portions between adjacent cells.

11. The aeroengine nacelle structure of claim 10, the openings in the wall portions being located in the region of the imperforate backing component part.

12. The aeroengine nacelle structure of claim 1, the facing component part having a ratio of open surface area to total surface area providing noise attenuation in the intake duct and the plurality of flow apertures being provided by the open surface areas of the facing component part.

13. The aeroengine nacelle structure of claim 1, the flow apertures being formed in the attenuation panel in predetermined spaced relation to each other and the facing component part being otherwise so formed as to provide in the regions between the fluid flow apertures a ratio of open surface area to total surface area for effective noise attenuation in the intake duct.

14. The aeroengine nacelle structure of claim 1, the facing component part of the noise attenuation panel having a porous permeable sheet produced by powder sintering a thermoplastic material.

15. The aeroengine nacelle structure of claim 1 further comprising an aeroengine to which a flow of intake air is supplied through the intake duct.

16. An aeroengine nacelle structure including an intake duct, comprising a lipskin defining an intake throat leading into the intake duct and including a noise attenuation panel having a facing component part with a front face which forms a boundary surface of the intake duct and which is subjected to fluid flow over it in a boundary layer adjacent the boundary surface, the facing component part of the noise attenuation panel having a plurality of flow apertures which extend through the facing component part at a downstream region of the attenuation panel and at an upstream region of the attenuation panel, the downstream region and the upstream region defining end portions of the intake duct between which shockwave induced pressure gradients are generated, the noise attenuation panel further having a cellular component part adjoining a rear face of the facing component part, the cellular component part having fluid communication path means for withdrawing gaseous fluid from a high pressure region of the boundary layer through the apertures at the downstream region of the attenuation panel, conveying within the cellular component part and discharging through the apertures at the upstream region of the attenuation panel into a low pressure region of the boundary layer to control boundary layer separation of the boundary layer from the boundary surface of the attenuation panel arising from shockwave induced pressure gradients in the boundary layer.

17. The aeroengine nacelle structure of claim 16, the gaseous fluid being conveyed from the high pressure region of the boundary layer at the downstream region of the attenuation panel to the low pressure region of the boundary layer at the upstream region of the attenuation panel solely as a consequence of the difference in pressures in the boundary layer at the downstream and upstream regions.

18. The aeroengine nacelle structure of claim 16, the fluid communication path means being confined within the intake duct to a predetermined control region of the intake duct.

19. The aeroengine nacelle structure of claim 18, the predetermined control region being that region only of the intake duct subjected to shockwave induced pressure gradients generated at high nacelle structure incidences and full engine thrust under aircraft takeoff conditions.

20. The aeroengine nacelle structure of claim 19, the predetermined control region of the intake duct extending circumferentially over a predetermined sector of the intake duct.

21. The aeroengine nacelle structure of claim 20, the sector extending symmetrically to each side of the base center line of the intake duct.

* * * * *

UNITED STATES PATENT AND TRADEMARK OFFICE
CERTIFICATE OF CORRECTION

PATENT NO. : 5,743,488
DATED : April 28, 1998
INVENTOR(S) : STEPHEN C. ROLSTON et al.

It is certified that error appears in the above-identified patent and that said Letters Patent is hereby corrected as shown below:

In claim 5 (col. 7, line 49), delete "2" and insert therefor -- 4 --.

Signed and Sealed this

First Day of September, 1998

Attest:

BRUCE LEHMAN

*Attesting Officer*     *Commissioner of Patents and Trademarks*